United States Patent
Gyulai

(10) Patent No.: US 12,368,206 B2
(45) Date of Patent: Jul. 22, 2025

(54) ENERGY STORAGE DEVICE FOR STORING ELECTRICAL ENERGY, METHOD FOR MANUFACTURING AN ENERGY STORAGE DEVICE, AND MOTOR VEHICLE

(71) Applicant: AUDI AG, Ingolstadt (DE)

(72) Inventor: Tamas Gyulai, Pfaffenhofen an der Ilm (DE)

(73) Assignee: AUDI AG, Ingolstadt (DE)

(*) Notice: Subject to any disclaimer, the term of this patent is extended or adjusted under 35 U.S.C. 154(b) by 528 days.

(21) Appl. No.: 17/513,166

(22) Filed: Oct. 28, 2021

(65) Prior Publication Data

US 2022/0166101 A1 May 26, 2022

(30) Foreign Application Priority Data

Nov. 23, 2020 (DE) .......................... 102020130835.3

(51) Int. Cl.
*H01M 50/242* (2021.01)
*H01M 50/207* (2021.01)
*H01M 50/249* (2021.01)

(52) U.S. Cl.
CPC ....... *H01M 50/242* (2021.01); *H01M 50/207* (2021.01); *H01M 50/249* (2021.01); *H01M 2220/20* (2013.01)

(58) Field of Classification Search
CPC .................................................. H01M 50/242
See application file for complete search history.

(56) References Cited

U.S. PATENT DOCUMENTS

| 5,598,500 A | * | 1/1997 | Crespel | ................ H02G 15/007 385/100 |
| 2003/0027028 A1 | * | 2/2003 | Davis | .................. H01M 8/0226 429/522 |
| 2014/0038029 A1 | * | 2/2014 | Thurmeier | .............. B60L 58/21 429/156 |

(Continued)

FOREIGN PATENT DOCUMENTS

| CN | 103370811 A | 10/2013 |
| CN | 104521024 A | 4/2015 |

(Continued)

OTHER PUBLICATIONS

Office Action issued on Aug. 1, 2024, in corresponding Chinese Application No. 202111386032.6, 15 pages.

(Continued)

*Primary Examiner* — Julian D Huffman
*Assistant Examiner* — Sadia Kousar
(74) *Attorney, Agent, or Firm* — Maier & Maier, PLLC

(57) ABSTRACT

An energy storage device for storing electrical energy. A housing frame of the energy storage device has respective housing end walls on two opposite end faces of the housing frame. The energy storage device has at least one battery cell stack. Respective stack end plates are arranged on two opposite end faces of the battery cell stack, which end plates are fastened in the housing frame of the energy storage device and by which end plates the battery cell stack is subjected to a compressive pressure. The stack end plates are aligned parallel to the housing end walls. At least one of the stack end plates is separated from a housing end wall located opposite to it by a space free of a battery cell stack.

15 Claims, 4 Drawing Sheets

(56) References Cited

U.S. PATENT DOCUMENTS

| | | | | |
|---|---|---|---|---|
| 2017/0288254 A1* | 10/2017 | Strahl | ............... | H01M 8/2404 |
| 2021/0257691 A1* | 8/2021 | Einoegg | ............. | H01M 10/625 |
| 2021/0328301 A1* | 10/2021 | Chen | ................. | H01M 50/249 |
| 2023/0078192 A1* | 3/2023 | Kita | ................... | H01M 50/242 |
| | | | | 429/99 |

FOREIGN PATENT DOCUMENTS

| | | | | | |
|---|---|---|---|---|---|
| CN | 104781947 | A | | 7/2015 | |
| CN | 107275662 | A | | 10/2017 | |
| CN | 210074020 | U | * | 2/2020 | |
| CN | 111341985 | A | * | 6/2020 | ......... H01M 50/147 |
| CN | 111834571 | A | | 10/2020 | |
| CN | 211879464 | U | | 11/2020 | |
| DE | 102011076583 | A1 | | 11/2012 | |
| DE | 102011106116 | A1 | | 12/2012 | |
| DE | 102013021234 | A1 | | 6/2015 | |
| DE | 102017216782 | A1 | | 3/2019 | |

OTHER PUBLICATIONS

German Search Report issued on Jul. 12, 2021 in corresponding German Application No. 102020130835.3; 10 pages; Machine translation attached.

Office Action issued on Dec. 29, 2023, in corresponding Chinese Application No. 202111386032.6, 18 pages.

\* cited by examiner

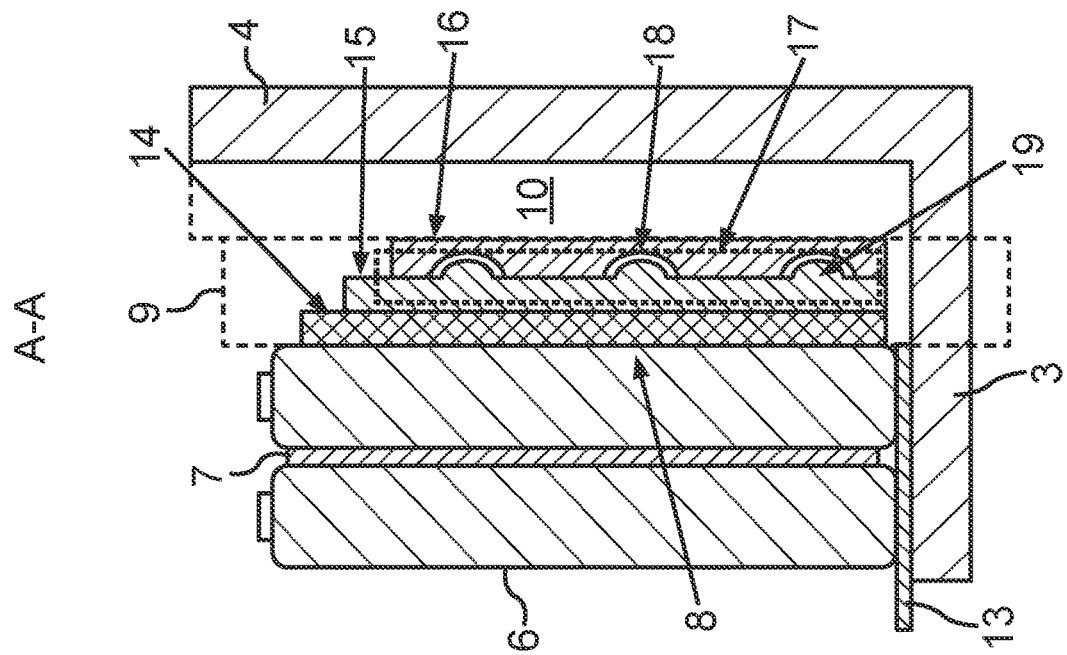
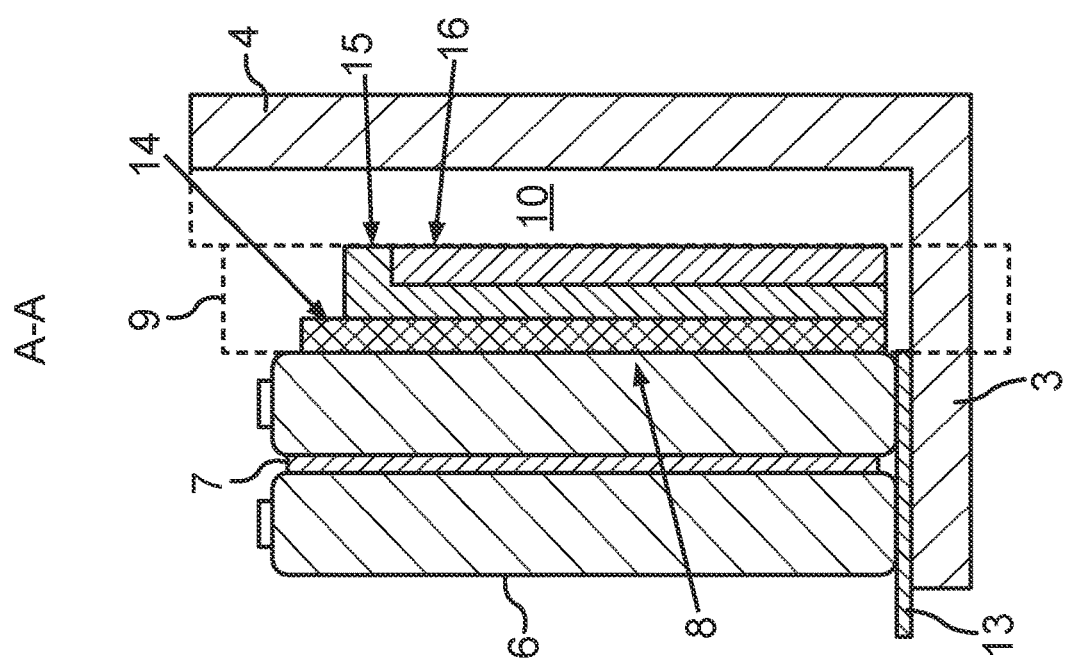

ENERGY STORAGE DEVICE FOR STORING ELECTRICAL ENERGY, METHOD FOR MANUFACTURING AN ENERGY STORAGE DEVICE, AND MOTOR VEHICLE

FIELD

The invention relates to an energy storage device for storing electrical energy, a method for producing an energy storage device, and a motor vehicle comprising at least one energy storage device.

BACKGROUND

Energy storage devices for electrically powered vehicles have a hierarchical structure. An energy storage device includes multiple battery cells, which are typically lithium ion cells. Several of these battery cells are arranged together with a control module in a module housing as a battery module. The battery modules are arranged together in a battery housing, also called a battery frame, which protects the battery modules from external mechanical loads. In order to reduce cell aging, particularly in the case of lithium-ion cells, it is customary to compressively bias the cells by the respective module housing. In the case of energy storage devices that are constructed according to the cell-to-pack hierarchy, the battery cells are not arranged in battery modules. As a result, the module housing, which is usually used to bias the battery cells, is eliminated. Instead, the individual battery cells are either installed directly in the battery housing without mechanical biasing or they are arranged in a battery cell stack, which is also referred to as a stack, which is compressively biased with a simple tension band. If the mechanical bias dispensed with, battery cells experience faster cell aging. Mechanical biasing of the battery cell stack by the battery housing is only possible to a limited extent. The battery housing is primarily intended to protect the battery cell stack from mechanical deformation due to external influences, in particular in the event of an accident. The problem here is that the two tasks place different requirements on the housing. A battery housing, which is intended to protect the battery cells from external mechanical deformation, must be relatively rigid in order to avoid deformation of the battery housing and thus damage to the battery cells in the event of an accident. It is important to ensure that the battery housing is designed in such a way that it can absorb a sudden load of, for example, 120 kilonewtons without breaking. Bending of the battery case must also be kept to a minimum.

In contrast, a certain flexibility is required for applying a mechanical bias to the battery cell stack by the battery housing, such that it can bend to a certain extent. This is necessary because the volume of the battery cells changes during a charging cycle and due to aging processes during the life of the battery cells. The battery cell volume increases as a result of aging processes, whereby the pressure applied to a housing by the battery cells increases. It is therefore necessary for the battery housing to yield to a certain extent in order to compensate for the changing pressure. The battery housing must be designed in such a way that material fatigue due to the cyclical load during the charging cycles is as low as possible.

Because of these different requirements for the housing, no solution has yet been found which fulfills both tasks at the same time to a satisfactory extent.

DE 10 2017 216 782 A1 describes a battery module housing for a vehicle. The battery module housing shown is a housing which comprises a battery module. The battery module housing comprises at least one recess for receiving and fixing a tension band, as a result of which the battery module is biased.

DE 10 2011 106 116 A1 describes a battery block made of prismatic battery cells. The battery block consists of a large number of individual battery cells which are arranged in a common housing. The battery block has clamping plates, which form an elastic clamping device by means of tension bands and which bias the prismatic battery cells bias into a stable package to reliably mechanically fix these battery cells of the battery block, such that they move only a little when subjected to external forces and vibrations and, on the other hand, have sufficient space to absorb changes in volume.

DE 10 2011 076 583 A1 describes an energy storage module made up of several, in particular prismatic, storage cells and a method for producing an energy storage module. The energy storage module comprises several, in particular prismatic, storage cells which are stacked at least in a row, arranged one behind the other and braced between at least two end plates via at least one tie rod or a winding. At least one of the end plates has a layer structure of at least three layers and/or the tie rod consists of a fiber composite material.

SUMMARY

It is an object of the invention to provide an energy storage device which fulfills both the requirement against an external mechanical load and also for sufficient biasing of the battery cell stack.

The invention relates to an energy storage device for storing electrical energy. The energy storage device can for example be a traction accumulator which is provided to store energy for driving a motor vehicle. The energy storage device has a housing frame. This frame can contain steel or an aluminum alloy, for example, and be provided to protect the functional components of the energy storage device from mechanical damage. The housing frame of the energy storage device has respective housing end walls on two opposite end faces of the housing frame. The housing frame can be designed, for example, as a cuboid frame which can have the two housing end walls at its longitudinal ends. The energy storage device has at least one battery cell stack, wherein respective stack end plates are arranged on two opposite end faces of the battery cell stack, which end plates are fastened in the housing frame of the energy storage device and by which end plates the battery cell stack is subjected to a compressive pressure. In other words, the at least one battery cell stack is arranged between the housing end walls, such that the housing frame apply a compressive pressure on the battery cell stack via the two stack end plates. In other words, the battery cell stack is compressed by the two stack end plates. The stack end plates of the at least one battery cell stack are aligned parallel to the housing end walls. At least one of the stack end plates is separated from a housing end wall located opposite to it by a space free of a battery cell stack. In other words, at least one of the stack end plates does not rest against an opposite housing end wall, but is spatially separated from it by a free space. There is therefore no battery cell stack between this stack end plate and the opposite housing end wall. Instead, a cavity or a crash structure can be located in this area, which can be provided for the plastic absorption of deformations. The invention has the advantage that the energy storage device both meets the requirements with respect to an externally acting mechanical load and enables the battery cell stack to be biased. The housing frame and the housing end walls can be configured to protect the battery stack in the event of an accident. In contrast, the stack end plates can be configured to apply a pilot pressure on the battery cell stack and to yield to a certain extent in relation to volume fluctuations of the battery cell stack. The stack end plates can in this case be configured for a cyclical load to limit material fatigue due to the cyclical change in volume of the battery cell stack. The housing end wall, on the other hand, can be configured to withstand particularly high external, sudden mechanical loads and only yield to a lesser extent. By providing a gap between the stack end plate and the housing end wall, the stack end plate can yield to a certain extent without being obstructed by the housing end wall. In addition, a crush zone can be set up by the gap, such that a yielding housing end wall does not act directly on the stack end plate and damage it.

In a further development of the invention, the stack end plates are configured as composite plates with at least two layers. In other words, the stack end plates are plates with a composite structure made up of at least two layers arranged on top of one another. Such an arrangement is also known as a sandwich structure. The two layers consist of different materials or phases which have different mechanical properties. The further development results in the advantage that the mechanical properties of two different layers can be combined with one another. For example, a first layer of a stack end plate can be more resilient to deformation of the battery cell stack than a second of the at least two layers. As a result, for example, the first layer can be configured for slight deformations, while the second layer is configured for greater deformations which cannot be absorbed by the first layer.

In a further development of the invention, the stack end plates are configured as composite plates with a steel layer, an aluminum layer, and a plastic layer. In other words, the stack end plate comprises at least one layer made of steel, one layer made of aluminum, and one layer made of plastic. This has the advantage that, by choosing a plastic, a material is selected which is very flexible with respect to deformation, while aluminum and steel are relatively rigid materials selected.

In a further development of the invention, the stack end plates have a deformation structure. In other words, the stack end plate has a geometric structure which is provided for the plastic absorption of deformations. For example, the deformation structure can be arranged between the aluminum layer and the steel layer. The deformation structure can for example have a cavity which is a recess in the steel layer. A bulge in the aluminum layer can protrude into this cavity. This has the advantage that, when the aluminum layer is deformed, the cavity in the steel layer is filled by the material of the aluminum layer. As a result, the aluminum layer rests directly against the steel layer there, which locally reinforces the stack end plate.

In a further development of the invention, at least one of the stack end plates is arranged between two battery cell stacks. In other words, at least one of the stack end plates simultaneously represents an end plate of two battery cell stacks. This has the advantage that two of the battery cell stacks are biased by the stack end plate. For example, two battery cell stacks can be arranged one behind the other and respective end faces of the battery cell stacks can rest against the stack end plate.

In a further development of the invention, at least one stack end plate has elongated holes through which it is screwed into the housing frame. In other words, the stack end plate has elongated holes which are provided to accommodate screws for screwing the stack end plate into the housing frame. The elongated holes run longitudinally parallel to the effective direction of the pressure and can in particular be configured as through holes. This has the advantage that the production of the energy storage device is facilitated. The battery cell stack can be pressed together during production until a predetermined stack size is reached. When the stack size is reached, the stack end plate can be screwed through the elongated holes. By choosing elongated holes, a desired bias can be selected during manufacture, which means that a more flexible selection is possible than with a regular hole.

In a further development of the invention, the energy storage device has at least one tension band that is screwed into at least two stack end plates. In other words, the energy storage device has at least one tension band which is fastened to the stack end plates to thereby apply a compressive force on the battery cell stacks.

In a further development of the invention, the at least one tension band is attached to the housing frame. In other words, the tension band is mechanically firmly connected to the housing frame. For example, the tension band can be screwed into the housing frame on two ends. This has the advantage that the tension band is fixed in its position.

In a further development of the invention, the housing frame has blind holes which are reinforced by means of reinforcing elements. In other words, the housing frame has blind holes to allow the stack end plates and/or the tension band to be screwed into the housing frame by means of screws. The housing frame has reinforcing elements in the area of the blind holes. The reinforcement elements can have a different material than the rest of the housing frame to allow a greater local load. The further development results in the advantage that the housing frame can be specifically reinforced in local areas for attachment.

The invention also includes a method for manufacturing an energy storage device. In a housing frame of the energy storage device, which has respective housing end walls on two opposite end faces of the housing frame, at least one stack end plate is fastened parallel to one of the housing end walls and separated therefrom in the housing frame by a space free of battery cells. A battery cell stack is arranged with one end face on the stack end plate. A second stack end plate is arranged on a second end face of the battery cell stack. The battery cell stack is subjected to a compressive pressure and the stack end plate is screwed into the housing frame. The invention also includes a motor vehicle with at least one energy storage device. The motor vehicle according to the invention is preferably designed as an automobile, in particular as a passenger car or truck, or as a passenger bus or motorcycle.

The invention also includes further developments of the method according to the invention and the motor vehicle according to the invention, which have features as already described in the context of the further developments of the energy storage device according to the invention. For this reason, the respective further developments of the motor vehicle according to the invention are not described again here.

The invention also comprises combinations of the features of the described embodiments. The invention therefore also includes implementations which each comprise a combination of the features of several of the described embodiments, unless the embodiments have been described as mutually exclusive.

BRIEF DESCRIPTION OF THE FIGURES

Exemplary embodiments of the invention are described below. Wherein:

FIG. 2 shows a section through the line A-A marked in FIG. 1;

FIG. 2 shows a section through the line A-A marked in FIG. 1;

FIG. 3 shows a section through the line A-A marked in FIG. 1;

DETAILED DESCRIPTION

Figure 1:
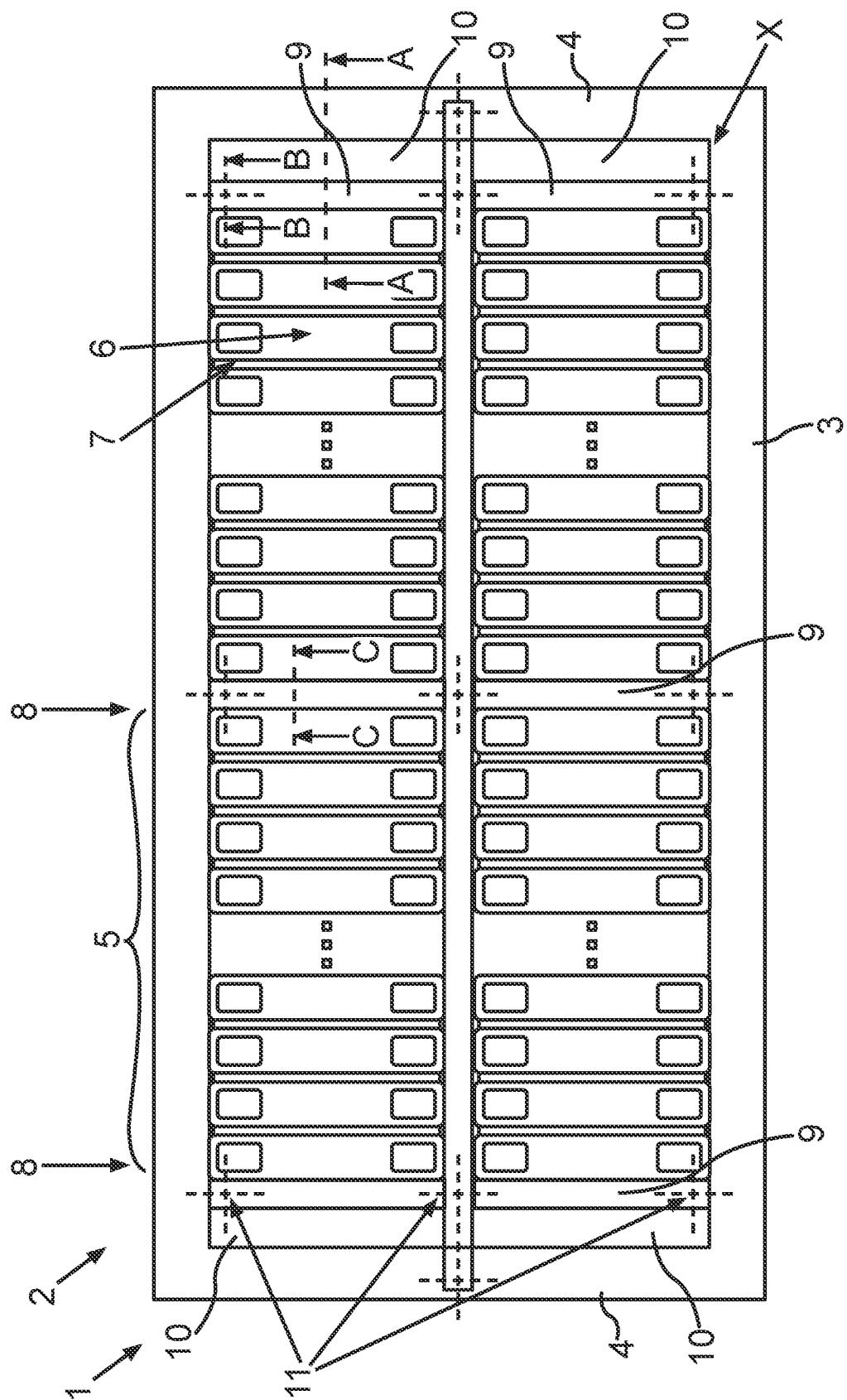
FIG. 1 shows a possible motor vehicle 1 according to the invention.

The exemplary embodiments explained below are preferred embodiments of the invention. In the exemplary embodiments, the described components of the embodiments each represent individual features of the invention to be considered independently of one another, which each also develop the invention further independently of one another. Therefore, the disclosure is also intended to include combinations of the features of the embodiments other than those shown. Furthermore, the described embodiments can also be supplemented by other features of the invention that have already been described.

In the figures, like reference numerals designate elements that have the same function.

FIG. 1 shows a possible motor vehicle 1 according to the invention with an energy storage device 2. The energy storage device 2 can be, for example, a traction battery which is installed in a hybrid or fully electric motor vehicle 1. The energy storage device 2 has a housing frame 3 by which the interior of the energy storage device 2 is at least partially enclosed to protect the energy storage device 2 from mechanical stress, in particular in the event of an accident. The housing frame 3 can be made of steel, for example. The housing frame 3 can be selected in terms of its dimensions and the type of steel in such a way that no significant deformation of the housing frame 3 occurs even under higher spontaneous loads. Housing end walls 4 can be arranged on two opposite sides of the housing frame 3. The housing end walls 4 can be connected to one another, for example, by at least two longitudinal walls. At least one or more battery cell stacks 5 can be arranged in a volume enclosed by the housing frame 3. The battery cell stacks 5 can have a plurality of battery cells 6 which, for example, have a prismatic shape and are arranged in an auxiliary housing and separated from one another by separating layers 7. The battery cell stacks 5 can have respective end faces 8 at their longitudinal ends, on which stack end plates 9 can be arranged. The stack end plates 9 can be fastened in the housing frame 3 and apply a compressive pressure on the battery cell stacks 5. At least one of the stack end plates 9 can be spatially separated from one of the housing end walls 4 by a free space 10. The free space 10 can be a space in which there is no battery cell 6. This free space 10 can be empty to allow mechanical deformation of the stack end plate 9. The free space 10 can prevent the deformation of the stack end plate 9 from being restricted by the rigid housing end wall 4. Furthermore, the installation space can prevent deformation of the stack end plate 9 by one of the housing end walls 4 should the housing end wall 4 give way in the event of an accident. A so-called crash structure can also be arranged in the free space 10. This can be a structure that is designed to plastically absorb mechanical deformation energy. Screw connections 11 of the stack end plates 9 take place in the housing frame 3, such that the stack end plates 9 can be fastened in the housing frame 3. There can also be a screw connection 11 of a stack end plate 9 with a tension band 12, which band can be screw-connected both in the housing frame 3 and in the stack end plates 9. The tension band 12 can be provided to transmit an additional bias to the stack end plates 9. The stack end plates 9 can be designed in such a way that the volume variations of the battery cell stack 5 during a charging cycle or during the life of a battery cell 6 result in little material fatigue.

FIG. 2 shows a section through the line A-A marked in FIG. 1 in a simplified representation. FIG. 2 can show a section through a stack end plate 9, which can be arranged on an end face 8 of a battery cell stack 5. The battery cell stack 5 can comprise at least two prismatic battery cells, which can be separated from one another by a partition wall 7. The battery cell stack 5 can be separated from the housing frame 3 by a filling element 13. It is visible in cross section that the free space 10, in which no battery cell 6 is arranged, is located between the stack end plate 9 and the housing end wall 4. The crash structure already mentioned above, for example, can be arranged in this area. The stack end plate 9 can be designed as a composite plate and have three layers, for example, wherein a first layer 14 resting against the battery cell stack 5 can comprise plastic, a second layer 15 can comprise aluminum, and a third layer 16 can comprise steel. Such a structure is also known as a sandwich structure. The division of the layers can proceed from the end face 8 of the battery cell stack 5 toward the free space 10. The first layer 14 made of plastic can be closest to the battery cell stack 5 and rest directly on it. The second layer 15 can have an aluminum alloy and, for example, rest against the layer 14 made of plastic. The last layer 16 can comprise steel and rest against the aluminum layer 15. The volume of the battery cells 6 and thus the volume of the battery cell stack 5 can increase with increasing age of the battery cell stack 5. It is necessary here that the stack end plate 9 yields to a certain extent. The first layer 14 made of plastic is more flexible than the other layers. As a result, the increase in volume at the beginning of the pressure increase is first absorbed by the plastic layer 14. The aluminum layer 15 and the steel layer 16 are relatively rigid in comparison. As the pressure increase progresses, the plastic layer 14 can yield to higher pressure values and the pressure can be absorbed by the aluminum layer 15. In the last phase of life of the battery cell stack 5, in which the highest values of the pressure P occur, the deformation can be absorbed by the steel layer 16.

FIG. 3 again shows a cross section along the line A-A marked in FIG. 1. It shows the progress already described in connection with FIG. 2. In addition to the illustration in FIG. 2, FIG. 3 shows a possible stack end plate 9 with a possible deformation structure 17. The deformation structure 17 can consist of a recess 18 in the steel layer 16, into which a formation made of the aluminum layer 15 protrudes. If the pressure P applied by the battery cell stack 5 deforms the aluminum layer 15, the recess in the deformation structure 17 can be filled with material from the aluminum layer 15. As a result, the rigidity of the stack end plate 9 can be increased.

Figure 4:
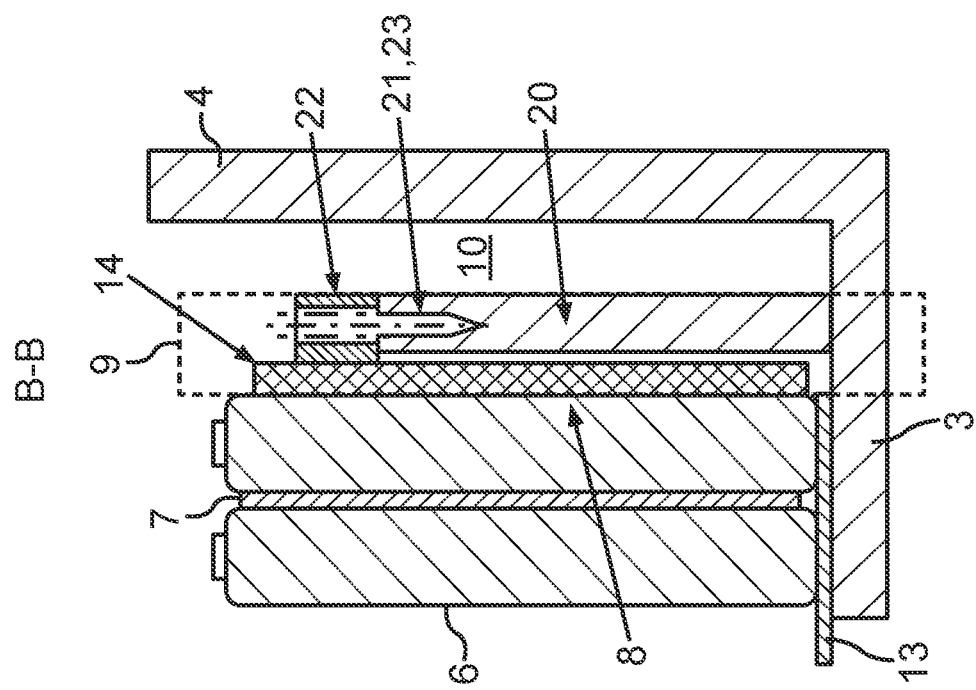
FIG. 4 shows a section through the line B-B marked in FIG. 1.

FIG. 4 shows a possible cross section along the line marked B-B in FIG. 1. As an example, it is shown here how a respective stack end plate 9 can be screwed into the housing frame 3. The housing frame 3 can have projections 20 which protrude into an interior of the housing frame 3. A blind hole 21 can be arranged in a respective projection 20. The stack end plate 9 can have an elongated hole 22 as a through hole, which is arranged over the blind hole 21 in a screwed state. This results in the advantage that if the battery cell stack 5 is acted upon during manufacture, flexible screwing of the stack end plate 9 into the housing frame 3 is made possible. The housing frame can have a reinforcing element 23 in the region of the blind hole 21. This can be an element which comprises a different material that differs from that of the rest of the housing frame 3 and which is more resistant to deformation.

Figure 5:
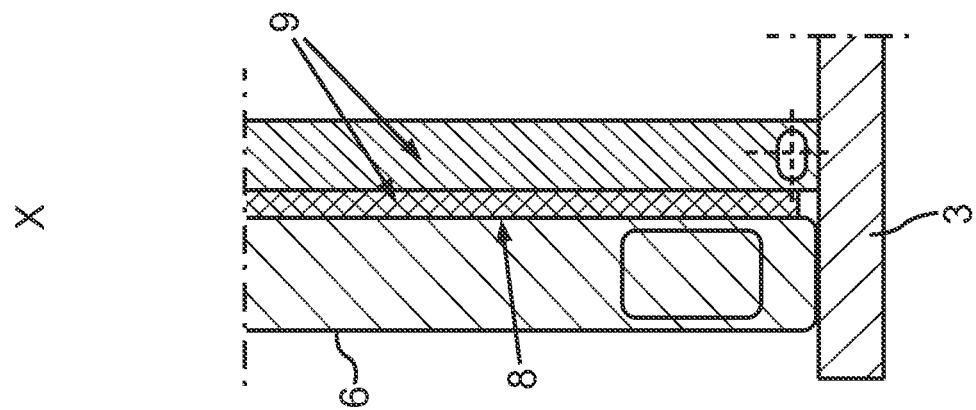
FIG. 5 shows the area X marked in FIG. 1.

FIG. 5 shows an area which is provided with the designation X in FIG. 1. The elongated hole 22 of the stack end plate 9 can be seen, which has already been described in FIG. 4. This elongated hole can, for example, be incorporated in the aluminum layer 15 or the steel layer 16.

Figure 6:
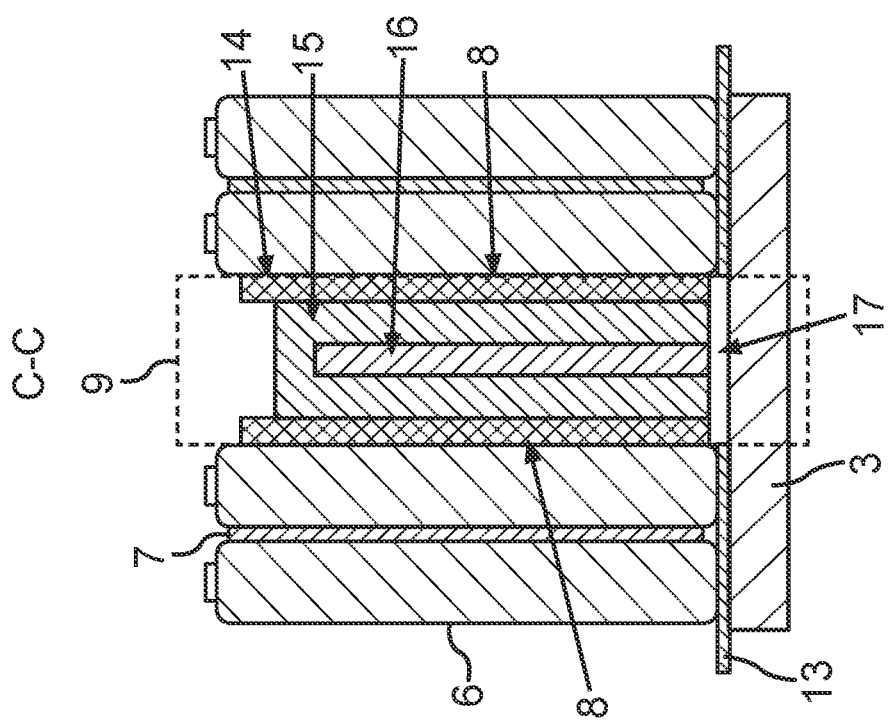
FIG. 6 shows a section through the line C-C marked in FIG. 1.

FIG. 6 shows a section marked with C-C in FIG. 1 in a simplified representation. The section runs through a stack end plate 9 which is arranged between two of the battery cell stacks 5. This stack end plate 9 can also consist of three layers 14, 15, 16. And it can in that respect have one layer 14 made of plastic, one made of aluminum 15, and one made of steel 16. The plastic layer 14 can rest directly against the end faces 8 of the battery cell stacks 5.

Figure 7:
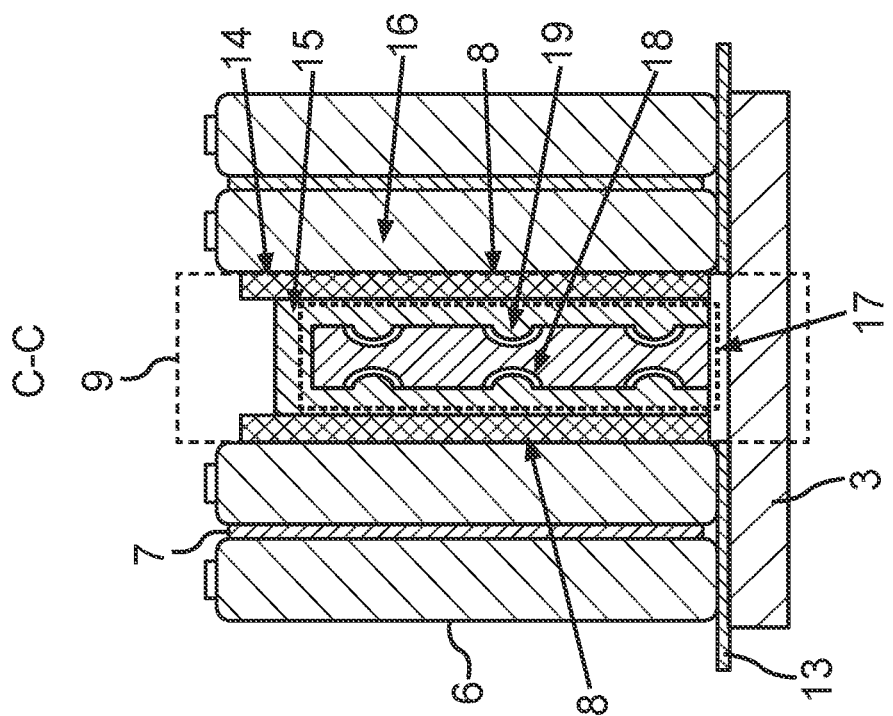
FIG. 7 shows a section through the line C-C marked in FIG. 1.

FIG. 7 shows the section shown in FIG. 6 with a possible deformation structure 17. Here, the steel layer 16 can also have recesses 18, into which recesses protuberances 19 of the aluminum layer 15 protrude.

In the current cell-to-pack designs, the battery cells are either installed in the housing without a defined bias or they are held together beforehand as a battery cell stack, also known as a stack, for example with a simple band.

Currently, all designs have the deficit that the battery cells age too quickly because biasing the battery cell stack is more complicated to accomplish in a cell-to-pack design than in designs in which the battery cells are arranged in a battery module.

The invention describes a battery design that provides the necessary flexibility in the battery housing, wherein no further parts, such as a spring or plates, are required. The flexibility is achieved by different material properties.

The battery housing of a cell-to-pack design must meet two important requirements at the same time:

In the event of an accident, the battery housing must not break due to the external force acting on the battery housing. The battery housing must therefore withstand and absorb the sudden very high load. Forces of 120 kN can act here, for example. This leads to a rigid, robust design that does not allow the battery cells to move.

At the same time, the inside of the battery housing must be soft and flexible and always allow a predetermined deformation of the battery cells. In this way, the battery housing is subjected to a constantly increasing force that is pulsating due to the charging cycles and which can amount to over 30 kN over the life of the battery.

These contradicting requirements could not be adequately met by any design up to now, because the aging of the battery cells is always higher than allowed in these designs.

The idea of the invention is to install stack end plates and a tension band into the battery housing.

The functions of the stacking end plate are:

Adjustment of the stack size and the bias of the battery cells during production with the help of elongated holes—see section B-B and the influence on cell aging by a "sandwich" design (plastic-aluminum-steel) of the stack end plate. This "sandwich" construction of the stack end plate can always ensure the necessary rigidity, depending on the cell aging. See section A-A. The forces and deformations that occur are absorbed locally and the forces are not introduced into the battery housing in many places. The stack end plate is fastened with screws in the battery housing.

The functions of the tension band are to limit the deformation within the battery and thus to better control the aging of the battery cell stack. Introducing the forces that occur through cell growth into the battery housing only at predetermined points, which means that deformations only occur locally to a limited extent at the coupling points of the housing. The tension band is fastened with screws in the battery housing.

If the deformations and the forces are introduced into the battery housing at certain points, the housing can be specifically reinforced at these points. It is also easier to design seals, because the sealing surfaces are only stressed by the deformations at known points.

Because the stack end plates consist of several materials, different rigidities arise due to the different material properties. In this way, the deformation of the battery cell can be controlled and recorded differently in the various aging phases, and the change in rigidity always creates an adjusted pressure on the battery cell:

At the beginning of the life of the battery cell, when only slight aging has taken place, a relatively low bias is required. In this phase, the battery cell needs stack end plates with a relatively low rigidity.

This low rigidity is ensured by a plastic. As the battery ages, the pressure in the battery cell increases. This increases the cell force acting on the end plate from the battery cell. Aluminum, which is stiffer than plastic, counteracts this. When this aluminum is bent, the deformation structure, which can be arranged as a free space (air gap) between the steel and aluminum layers, is filled and the rigidity of the stack end plate is further increased by the steel insert. See section A-A.

The battery cell stack must be biased during production. During assembly, one of the stacking end plates is attached to the battery housing. Then the battery cells are built into the battery together with the cell partitioning elements. After the last battery cell has been installed, the second stack end plate is installed in the battery. Before the second stack end plate is screwed on, the entire stack must be compressed to a predetermined amount using an auxiliary tool—this creates a force of around 1500 N, which is necessary for the initial aging phase. When the stack has the predetermined length, the stack end plate can be fixed in this position in the housing via elongated holes and screws.

The advantages of the invention are that the cell forces that arise as a result of cell aging do not stress the battery housing in many places; they are absorbed with the help of stacked end plates. This means that the deformation caused by cell growth is decoupled from the battery housing. The local loads on the battery housing allow a weight-optimized design of the battery housing. If the forces are absorbed with the stack end plates as far as possible, a design can be developed which enables the battery cells to age in a controlled manner and which can also meet the high crash requirements.

Overall, the examples show how cell biasing can be made possible by means of stack end plates in a cell-to-stack design.

The invention claimed is:

1. An energy storage device comprising:
   a housing frame having respective housing end walls on two opposite ends of the housing frame; and
   at least one battery cell stack, comprising respective stack end plates arranged on two opposite end faces of the at least one battery cell stack, where the stack end plates are fastened in the housing frame of the energy storage device, the at least one battery cell stack is subjected to a compressive pressure by the stack end plates, and each stack end plate is a composite plate with a steel layer, an aluminum layer, and an plastic layer, a deformation structure is arranged between the steel layer and the aluminum layer, the stack end plates are aligned parallel to the housing end walls, at least one of the stack end plates is spatially separated from a housing end wall located opposite to it by a free space, the free space being empty to allow mechanical deformation of the at least one stack end plate.

2. The energy storage device according to claim 1, wherein the deformation structure is defined by at least one recess in the steel layer, and, when the at least one of the stack end plates is subjected to a compressive pressure, the aluminum layer deforms such that the at least one recess is at least partially filled by material of the aluminum layer.

3. The energy storage device according to claim 2, wherein at least one of the stack end plates rests against end faces of two battery cell stacks.

4. The energy storage device according to claim 2, wherein at least one of the stack end plates has elongated holes, wherein the stack end plate is screwed on through the elongated holes in the housing frame.

5. The energy storage device according to claim 1, wherein at least one of the stack end plates rests against end faces of two battery cell stacks.

6. The energy storage device according to claim 5, wherein at least one of the stack end plates has elongated holes, wherein the stack end plate is screwed on through the elongated holes in the housing frame.

7. The energy storage device according to claim 1, wherein at least one of the stack end plates has elongated holes, wherein the stack end plate is screwed on through the elongated holes in the housing frame.

8. The energy storage device according to claim 1, wherein the energy storage device has at least one tension band which is screwed into at least two stack end plates.

9. The energy storage device according to claim 1, wherein the housing frame has blind holes which are reinforced by means of reinforcing elements.

10. A method for manufacturing the energy storage device according to claim 1, the method comprising:
    fastening at least one stack end plate parallel to one of the housing end walls and separated therefrom in a housing frame by the free space in the housing frame of the energy storage device, which has respective housing end walls on two opposite end faces of the housing frame,
    arranging one end face of a battery cell stack on the stack end plate,
    arranging a second stack end plate on a second end face of the battery cell stack,
    subjecting the battery cell stack to a compressive pressure, and
    screwing the stack end plate into the housing frame.

11. A motor vehicle, wherein the motor vehicle has at least one energy storage device according to claim 1.

12. The energy storage device according to claim 1, wherein at least one of the stack end plates has a deformation structure.

13. The energy storage device according to claim 1, wherein at least one of the stack end plates rests against end faces of two battery cell stacks.

14. The energy storage device according to claim 1, wherein at least one of the stack end plates has elongated holes, wherein the stack end plate is screwed on through the elongated holes in the housing frame.

15. The energy storage device according to claim 1, wherein the energy storage device has at least one tension band which is screwed into at least two stack end plates.

* * * * *